United States Patent [19]
Hartig

[11] 3,859,423
[45] Jan. 7, 1975

[54] CLOSED POND SYSTEM FOR WET PROCESS PHOSPHATE PLANTS

[76] Inventor: Rufus G. Hartig, 230 Hillsboro Hotel Building, Dover, Fla. 53602

[22] Filed: July 24, 1972

[21] Appl. No.: 274,222

Related U.S. Application Data
[63] Continuation-in-part of Ser. No. 60,226, Aug. 3, 1970, Pat. No. 3,720,757.

[52] U.S. Cl................. 423/472, 423/320, 423/464, 423/490
[51] Int. Cl....................... C01b 11/00, C01b 25/16
[58] Field of Search.......................... 423/317–321, 423/472, 464, 490

[56] References Cited
UNITED STATES PATENTS

| | | | |
|---|---|---|---|
| 1,664,348 | 3/1928 | Buchner............................. | 423/483 |
| 3,258,308 | 6/1966 | Peterson et al..................... | 423/484 |
| 3,720,757 | 3/1973 | Hartig................................. | 423/341 |

OTHER PUBLICATIONS
Industrial and Engineering Chemistry Vol. 53, No. 9, Sept. 1961, 705–707.

*Primary Examiner*—Oscar R. Vertiz
*Assistant Examiner*—Gregory A. Heller
*Attorney, Agent, or Firm*—Carl B. Fox, Jr.

[57] ABSTRACT

Closed pond system or process for eliminating the conventional pond systems of wet process phosphoric acid complexes, and to remove fluorine process gas streams, wherein liquid effluents from wet process phosphoric acid complexes, including scrubber liquor from gas scrubbing operations of the complex, are cooled and clarified, and the liquid from the clarifier recycled to the phosphate complex, the sludge or slurry being filtered to remove solids, the solids being calcined to drive off fluorine-containing gases. The calcined solids consist principally of sodium fluoride (NaF) which is recycled to the clarifier overflow to be mixed with the liquid returned to the phosphate complex. In the phosphate complex the liquid from the clarifier is used to scrub plant gases, and is mixed with other scrubber liquors from the plant, and recycled again to the cooling tower and clarifier. The HF in the effluent plant liquids is converted to $SiF_4$ by maintaining an excess of $SiO_2$, and the NaF reacts with the $SiF_4$ to form $Na_2SiF_6$. The $Na_2SiF_6$ is calcined to produce NaF and gaseous $SiF_4$, the latter being scrubbed with water to form $H_2SiF_6$ of commercial quality.

2 Claims, 2 Drawing Figures

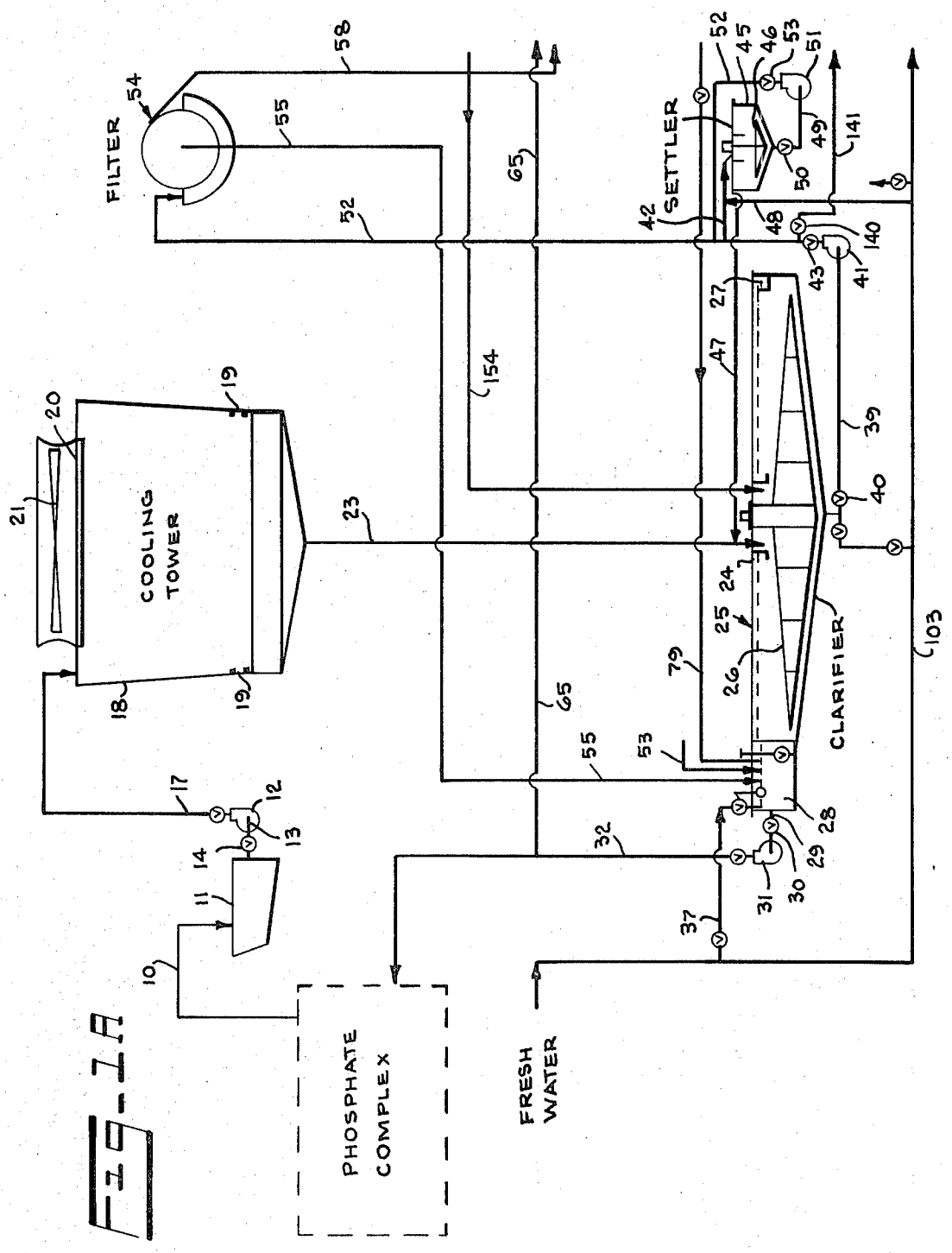

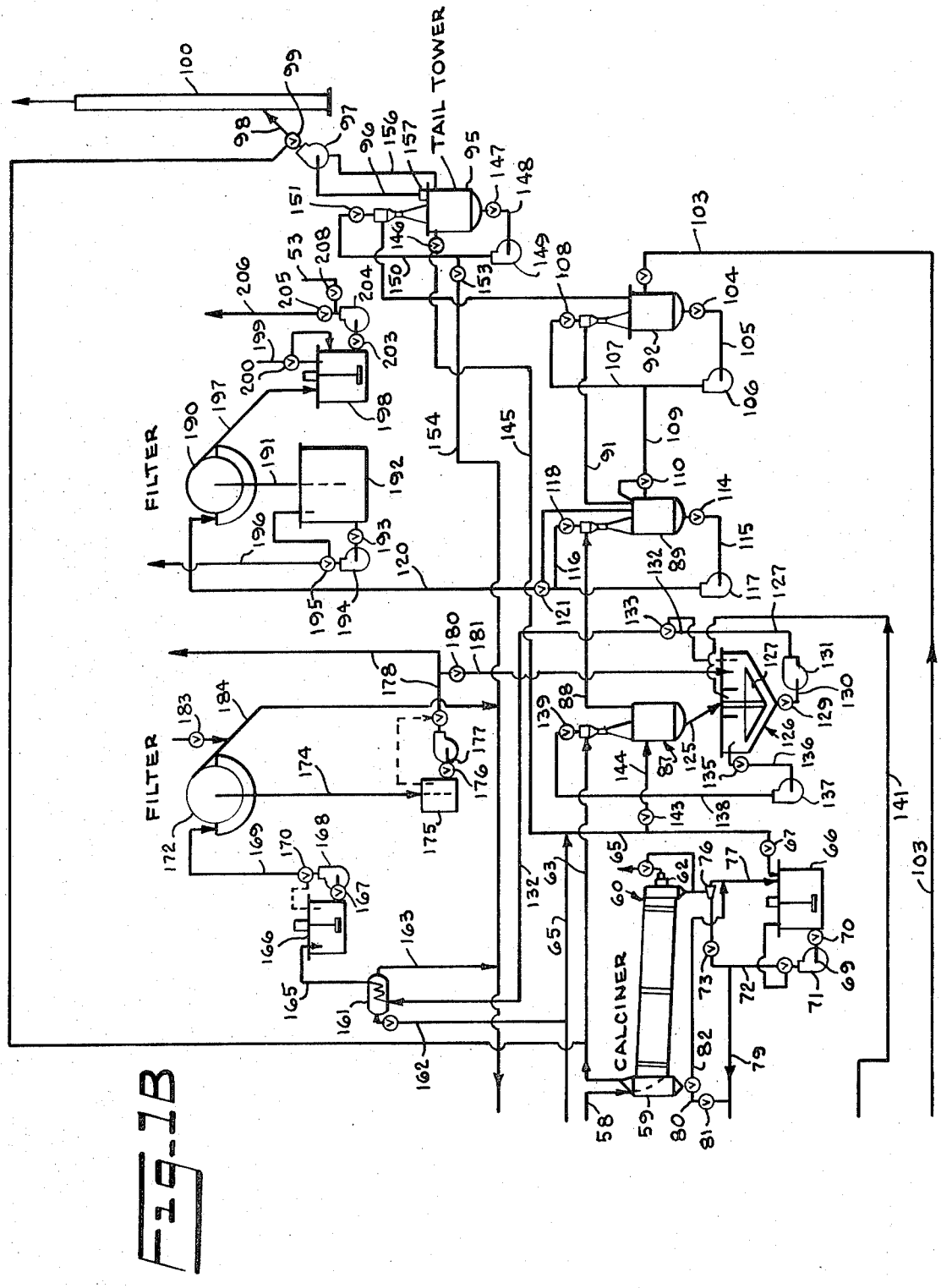

3,859,423

CLOSED POND SYSTEM FOR WET PROCESS PHOSPHATE PLANTS

This application is a continuation-in-part of applicant's application Ser. No. 60,226, filed Aug. 3, 1970, now U.S. Pat. No. 3,720,757 entitled "Closed Pond System for Wet Process Phosphate Plants."

BACKGROUND OF THE INVENTION

This process is designed to eliminate all contamination by gaseous fluorine liberated in phosphate rock processing from the waters used to slurry gypsum, in wet process phosphoric acid complexes, and to remove fluorine from process gas streams. In addition, various other benefits are obtained including fluorine recovery as a saleable product, elimination of liming costs, higher $P_2O_5$ recovery, and the like.

In current practice, by-product gypsum from wet process phosphoric acid complexes is slurried with water and pumped to a pond of vast acreage in which the gypsum settles out and the supernatant water is cooled in ponds and recycled to process for use as scrubbing water to remove fluorine from process gas streams, as condensing streams in barometric condensers, and to slurry gypsum. The fluorine content of this water builds up to appreciable concentrations presenting undesirable problems, such as surface water and ground water contamination by fluorine. Addition of lime to these waters is frequently resorted to in order to control pollution of surface waters into which the plant waters may become intermingled.

By the novel process herein presented, it is possible to eliminate this type of fluorine contamination by completely eliminating the use of gypsum slurry water in scrubbing and processing. All fluorine contaminated scrubbing liquor is handled and stored in impervious, lined equipment separate from the gypsum slurry system.

The liquid solution circulated through this process and the complex has a pH of 4.5-4.7, and therefore has no fluorine vapor pressure because the fluorine therein is present as the two stable salts, $Na_2SiF_6$ and $NaF$. This condition precludes the presence of any fluorine in the air exits of cooling towers, and in other equipment. The total gaseous fluorine emission from the entire closed pond system will be less than 15 pounds per day, for a phosphate complex of the size wherein the volume of liquid effluent is in the 16,000 gallons per minute range.

Other objects and advantages of the process herein disclosed will appear from the following detailed description of a preferred embodiment, reference being made to the accompanying drawings.

BRIEF DESCRIPTIONS OF THE DRAWINGS

FIGS. 1A and 1B are flow diagrams which together show a preferred embodiment of the process.

DESCRIPTION OF THE PREFERRED EMBODIMENT

Referring first to FIG. 1, the effluent leaving the phosphate complex enters the process at flowline 10, which leads into catch basin 11. The liquid contains approximately 0.66 percent fluorine, and is at a temperature of between 100°F and 120°F. The fluorine is present as $Na_2SiF_6$ which has been formed by the reaction between $NaF$ and $SiF_4$. A slight excess of reactive $SiO_2$ is maintained in the recirculating liquid stream to convert any HF to $SiF_4$ ($4HF + SiO_2 \rightarrow SiF_4 + 2H_2O$). The liquid also contains a small amount of NaF in solution.

The liquid is pumped from catch basin 11 by cooling tower lift pump 12, the flow being through flowline 13 containing valve 14 and, upon leaving the pump, through flowline 17 which delivers the liquid to the top of cooling tower 18.

The liquid passes downwardly through cooling tower 18, while air is drawn in through plural side inlets 19 to pass upwardly through mist eliminator 20, the air being drawn upwardly by a blower 21 driven by a motor, not shown. The cooling tower may be packed or equipped with baffles, or the like, in any suitable manner. Any suitable cooling tower may be substituted.

The cooled liquor which leaves the cooling tower by gravity through flowline 23 is at a temperature of 90° F, maximum. The liquid is delivered through flowline 23 into the inlet 24 of clarifier 25. The clarifier may be of any suitable form. Clarifier 25 as shown includes paddles or drags 26 which rotate in order to collect the thickened slurry at the lower center of the clarifier. The clarifier has a downwardly converging bottom or floor, and has therearound an overflow trough 27 in flow communication with an overflow sump 28. Liquid overflow from the clarifier exits through flowline 29 containing valve 30, pumped by pump 31 through flowline 32 which delivers the overflow liquid from the clarifier back to the phosphate complex, wherein the liquor is used for scrubbing and/or other plant purposes, the liquid being circulated through the complex to be returned to the herein described process through flowline 10.

Fresh water is added as necessary to the overflow sump 28 through flowline 37.

The overflow liquor from the clarifier contains approximately 0.6% fluorine, present as $Na_2SiF_6$, and a small excess of NaF in solution. This concentration of fluorine is approximately 0.06% less than the concentration of fluorine in the liquid entering the process through flowline 10. The excess fluorine in flowline 10 is derived from the phosphate complex scrubbing and washing operations.

The slurry leaving clarifier 25 at the center bottom thereof exits through flowline 39 having valve 40, being moved by pump 41 delivering the slurry through flowline 42 having valve 43 to settler 45. Settler 45 has a downwardly converging conical bottom, and is equipped with a motor driven paddle or drag 46. The overflow liquid from settler 45 is returned through flowline 47 to be mixed with the cooling tower liquid output in flowline 23.

Fresh water is added to the slurry from clarifier 25 delivered through flowline 42 to settler 45 through a flowline 48.

The concentrated slurry discharged from the center bottom of settler 45 is delivered through flowline 49 having valve 50, compelled by pump 51 through flowline 52 including valve 53 to a filter 54. The filter 54 is indicated in the drawing as being rotary drum filter, but other suitable filtration apparatus may be suitably used. The filtrate from filter 54 is discharged through flowline 55 by gravity to be mixed with the liquid overflow from clarifier 25 at overflow sump 28.

A water slurry of $SiO_2$ may be introduced to the clarifier overflow sump 28 through a flowline 53 in order to maintain the $SiO_2$ concentration in the liquid recirculated to the phosphate complex.

The solid materials collected at filter 54 are delivered by conveyor 58 to the feed 59 of a calciner 60. The calciner 60 is indicated in the drawing as being of the rotary drum, countercurrent flow type, but other suitable apparatus for this purpose may be substituted. Fuel and air are burned at burner 62 of calciner 60, the flue gas passing toward the left through the calciner to be discharged through flowline 63.

In calciner 60, $Na_2SiF_6$ is decomposed at a temperature of 1,350° F to produce solid NaF and gaseous $SiF_4$. The gaseous $SiF_4$ is discharged from calciner 60 through flowline 63 with the flue gases from the burner. A portion of the liquid in flowline 32 is diverted through flowline 65 to be introduced into NaF slurry tank 66, the amount introduced being controlled by valve 67. Slurry from tank 66 is circulated through flowline 69 including valve 70 by pump 71 which delivers the slurry through flowline 72 including valve 73 through the discharge 76 of calciner 60. Calcined NaF is discharged from the calciner to be mixed with the circulating slurry at 76. The slurry-solids mixture is passed through flowline 77 to the slurry tank 66.

A portion of the slurry in flowline 72 is passed through flowline 79 to be delivered into the clarifier overflow sump 28. A portion of the slurry passing through flowline 79 is circulated through flowline 80 having valve 81 through the bottom of calciner feed 59, to be delivered through flowline 82 for mixture with the slurry mixture in flowline 77. In this way, material at the calciner feed dust hood may be mixed with the slurry in slurry tank 66.

The flow through flowline 79 delivers make-up NaF to the closed pond circulating liquid returned to the phosphate complex through flowline 32.

The gases discharged from calciner 60 pass through flowline 63, through scrubber 87, and therefrom through flowline 88 to a second scrubber 89. After passing through scrubber 89, the gases are passed through flowline 91 to a third scrubber 92, and thence through flowline 93 to a fourth scrubber 95. From scrubber 95 the gases pass through flowline 96 to blower 97, and thence through flowline 98 havivng valve 99 to stack 100.

Fresh water is introduced to scrubber 92 to wash the gases, through flowline 103. The scrubber liquor from tower 92 exits through valve 104 and flowline 105 through pump 106 which delivers part of the liquid in recirculation through line 107 having valve 108, and which delivers a part of the liquid through flowline 109, flow through which is controlled by valve 110, into scrubber 89 wherein the scrubber liquor is contacted with the gases passing through the scrubber. The scrubber liquor is discharged from scrubber 89 through valve 114 and flowline 115, and is recirculated to the top of scrubber 89 through flowline 116, being propelled therethrough by pump 117. Flow through flowline 116 is controlled by valve 118. Scrubber slurry is withdrawn from this system through flowline 120 having valve 121.

Scrubber liquor from scrubber 87 is delivered through flowline 125 to settler 126. Settler 126 has a downwardly converging conical bottom and has rotating paddles or drags 127. Slurry from settler 126 is discharged from the bottom center of the settler through valve 129 and flowline 130 to be moved by pump 131 through flowline 132 having valve 133. Liquid overflow from the settler is discharged through valve 135 and flowline 136, pump 137 moving the liquid through flowline 138 having valve 139 to be recirculated through the scrubber 87. Slurry from clarifier 25 in flowline 42 can be diverted through valve 140 and flowline 141 to the feed of settler 126. A portion of liquor from flowline 65 is passed through valve 143 and flowline 144 to scrubber 87.

Flowline 145 branching from flowline 65 carries overflow liquid from clarifier 25 to the top of scrubber 95, flowline 145 having a control valve 146. Recirculating liquor in tower 95 drains through valve 147 and flowline 148 to be pumped by pump 149 through recirculation flowline 150, flowline 150 having valve 151. Scrubber liquor is withdrawn from flowline 150 through valve 153 and flowline 154 to be delivered into the feed inlet of clarifier 25. Liquid condensing in blower 97 is drawned through flowline 156 back to scrubber 95. The scrubber has a mist eliminator 157 through which the exit gas passes into flowline 96.

The gases leaving calciner 60 through flowline 63 contain $SiF_4$ derived from decomposition by heat of $Na_2SiF_6$ according to the reaction, $Na_2SiF_6 \xrightarrow{(heat)} 2NaF + SiF_4$. In the described system, scrubber 87 is a recycling scrubber provided primarily to remove fluoride dusts prior to recovery of the fluorine, and to convert the $NaH_2PO_4$ to $H_3PO_4$ by the reaction

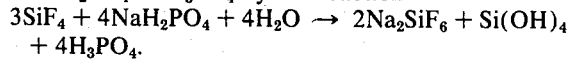

The slurry from settler 126 delivered through flowline 132 is passed through a heat exchanger 161 (cooler). Liquid from flowline 65 is passed through flowline 162 to cool the slurry and is returned through flowline 163 which communicates with flowline 154. The cooled slurry is passed through flowline 165 into agitated retention tank 166, from which it is delivered through valve 167 by pump 168 and through flowline 169 having valve 170 into filter 172. Filter 172 is indicated as being a rotary drum filter, but other types of filtration equipment may be substituted. The filtrate from filter 172 is delivered through flowline 174 to barometric seal tank 175, from which it passes through valve 176 and is pumped by pump 177 through flowline 178 which delivers recovered phosphoric acid, as explained below, to the phosphate complex. The phosphoric acid solution may be delivered through valve 180 and flowline 181 to settler 126. The cake from filter 172 is sluiced with liquor of any suitable nature and source or with water at 183 to be delivered through flowline 184 to mix with the scrubber liquor returned to clarifier 25 through flowline 154.

In the liquid circulation stream through cooling tower 18, clarifier 25, and the phosphate complex, phosphoric acid present in the liquor reacts with NaF and $SiO_2$ to form $NaH_2PO_4$, which has a pH of approximately 4.7 which is in the pH range of the circulating liquor. The chemical reaction is:

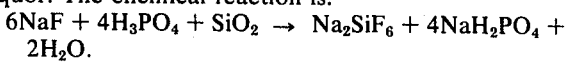

The $NaH_2PO_4$ concentration of the circulating liquor can be allowed to build up to 5 to 20 percent $P_2O_5$. $P_2O_5$ in the form of $NaH_2PO_4$ is continuously removed from the circulating liquor which is delivered to scrubber 87. Gaseous $SiF_4$ from calciner 60 reacts to form phosphoric acid as shown in the following chemical reactions:

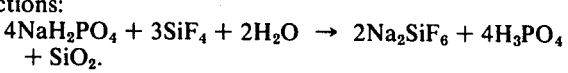

The circulating liquor is controlled by checking the pH and if the pH is at 4.7 or above there is a sufficient excess of NaF and $SiO_2$ present. If the pH falls below 4.7 there is a deficiency of $SiO_2$ or NaF in the system. Insoluble $Na_2SiF_6$ and $SiO_2$, which enter the phosphoric acid recovery area through flowline 132, are filtered out by filter 172 and recycled to the clarifier 25. The phosphoric acid obtained according to the above reaction is delivered through flowline 178 to the phosphate complex, or used in other suitable manner.

Since the scrubber liquor of scrubber 87 is saturated complex, at a specific gravity of about 1.1 – 1.2 and a temperature of about 90° F, or less.

Scrubber 87 may be omitted from the system by neutralizing the solution in clarifier 25 with ammonia to form $NH_4H_2PO_4$. $NH_4H_2PO_4$ is water soluble, and is carried with the filtrate from filter 54 through flowline 55 to be returned to the plant. In this case, the system including filter 172 would, of course, be also eliminated.

Operating data are shown for a typical plant in the following Table I, providing an example of the process:

Table I

Typical operating conditions

| Flowline | Flow rate through flowline Gal./Min. | Temperature °F | % $NaH_2PO_4$ (as $P_2O_5$) | % $Na_2SiF_6$ (as F) | % NaF | % $SiO_2$ | $Na_2SiF_6$, Lbs./Min. | % $H_2O$ | Flow rate through flowline S.Cu.Ft./Min. | % $SiF_4$ | % $H_3PO_4$ (as $P_2O_5$) | NaF, Lbs./Min. | $SiF_4$ Lbs./Min. | % $H_2SiF_6$ |
|---|---|---|---|---|---|---|---|---|---|---|---|---|---|---|
| 6 | 13,000 | 106 | 10.0 | 0.5 | Sl.XS | Sl.XS | | | | | | | | |
| 17 | 13,000 | 106 | 10.0 | 0.5 | Sl.XS | Sl.XS | | | | | | | | |
| 23 | 13,000 | 90 | 10.0 | 0.5 | Sl.XS | Sl.XS | | | | | | | | |
| 79 | 82 | | | | 15.0 | | | | | | | | | |
| 52 | 180 | | | | | | 184 | | | | | | | |
| 58 | | | | | | | 184 | 30 | | | | | | |
| 63 | | 600 | | | | | | 15.9 | 6600 | 4.8 | | | 102 | |
| 132 | 40 | 160 | | | | | 40 | 80 | | | 10 | | | |
| 77 | 82 | | | | | | | 90 | | | | 82 | | |
| 120 | 34 | 165 | | | | | | | | | | | | 20 |
| 93 | | 160 | | | | | | | 7500 | Trace | | | | |
| 100 | | | | | | | | | | Nil | | | | |
| 138 | 300 | 165 | | 0.7 | | | | | | | 10 | | | |
| 178 | 23 | | | | | | | | | | 10 | | | |
| 196 | 33 | 150 | | | | | | | | | | | | 20 | with respect to $SiF_4$, $SiF_4$ (gas) continuously passes through flowline 88 to scrubber 89, where the $SiF_4$ is recovered as a water solution of $H_2SiF_6$. Any remaining $SiF_4$ is recovered in scrubber 92, and tail scrubber 95 picks up any residue so that the gases passing out of stack 100 are essentially fluorine free. The scrubber liquor passing through flowline 120 is delivered through a filter 190, which is indicated to be of the rotary drum type, but for which any suitable type of filtration apparatus may be substituted. The filtrate passes through barometric leg flowline 191 to seal tank 192. This filtrate is a water solution of $H_2SIF_6$, which is delivered through valve 193, pump 194, and valve 195 through flowline 196 to storage. This solution is a valuable commercial product.

The filter cake from filter 190, consisting of $SiO_2$ in pure form is delivered by conveyor 197 to slurry tank 198 to which water is added through flowline 199 controlled by valve 200. The $SiO_2$ slurry is delivered through valve 203 by pump 204 through valve 205 and flowline 206 to the plant, for addition of $SiO_2$ to the plant process where needed or for other use. A part of the $SiO_2$ slurry is delivered through valve 208 and flowline 53, previously described, to the clarifier overflow sump 28.

Approximately 16,000 gallons per minute of plant effluent is delivered in a typical phosphate complex through flowlines 10 and 17 to cooling tower 18, the liquid being of a specific gravity of approximately 1.1 – 1.2, at a temperature of approximately 109° F. The cooled effluent in flowline 23 is at the same flow rate and has the same gravity, and its temperature is approximately 90° F, maximum.

In flowline 32, approximately 16,000 gallons per minute of return liquor is returned to the phosphate By conversion of the fluorine components ($SiF_4$ and HF) in the phosphate complex effluent to $Na_2SiF_6$, by maintaining an excess of NaF and $SiO_2$ in the liquid circulating through the process from the phosphate complex, and separating the $Na_2SiF_6$ from the circulating stream, the fluorine values are effectively removed from the phosphate complex effluent. By calcining the $Na_2SiF_6$, fluorine is recovered by water scrubbing as $H_2SiF_6$, and NaF is recovered for re-use. Phosphate values are recovered as $H_3PO_4$, or may be recycled to the plant as $NH_4H_2PO_4$. The gases from the process are essentially free of fluorine, and no water solutions are disposed of to result in contaminations of surface and ground waters.

While a preferred embodiment of the invention has been shown in the drawings and described, many modifications may be made by a person skilled in the art without departing from the spirit of the invention, and it is intended to protect by Letters Patent all forms of the invention falling within the scope of the following claims:

I claim:

1. Process for minimizing the fluorine vapor pressure of scrubber and wash liquors of phosphate complexes, fluorine in the liquors being principally in the form, $SiF_4$, comprising maintaining an excess of NaF in said liquors in the scrubbing towers and washing location of the phosphate complex so that substantially all $SiF_4$ which is absorbed by and dissolved in said liquors in the phosphate complex is immediately converted to solid $Na_2SiF_6$ in suspension according to the chemical reaction, $SiF_4 + 2\ NaF \rightarrow Na_2SiF_6$, flowing said liquors from said scrubbing towers and wash locations, separating $Na_2SiF_6$ from said liquors, calcining the separated $Na_2SiF_6$ to form NaF and $SiF_4$ according to the chemical reaction, $Na_2SiF_6 \xrightarrow{(heat)} 2NaF + SiF_4$, returning at least a portion of the NaF to said liquors to maintain said excess therein and absorbing the $SiF_4$ in water to form $H_2SiF_6$ in solution, whereby the fluorine vapor pressure of said liquors is maintained low, and returning said liquors to the scrubbing towers and wash locations of said phosphate complex for reuse.

2. The process according to claim 1, wherein any HF in said liquors in the phosphate complex is converted to $H_2SiF_6$ by addition of $SiO_2$ to said liquors, according to the chemical reaction, $6HF + SiO_2 \rightarrow H_2SiF_6 + 2H_2O$.

* * * * *